United States Patent
Pop et al.

(10) Patent No.: US 7,822,259 B2
(45) Date of Patent: Oct. 26, 2010

(54) METHOD FOR POSITIVE IDENTIFICATION OF INNER SURFACE AND OUTER SURFACE OF SAMPLE FLAKES

(75) Inventors: Mihai G. M. Pop, Lynchburg, VA (US); John Carroll Griffith, Lynchburg, VA (US); William Edward Allmon, Lynchburg, VA (US); Brian Glenn Lockamon, Evington, VA (US)

(73) Assignee: Areva NP Inc., Lynchburg, VA (US)

( * ) Notice: Subject to any disclaimer, the term of this patent is extended or adjusted under 35 U.S.C. 154(b) by 1188 days.

(21) Appl. No.: 11/441,743

(22) Filed: May 26, 2006

(65) Prior Publication Data

US 2008/0069454 A1    Mar. 20, 2008

(51) Int. Cl.
   *G06K 9/00* (2006.01)
(52) U.S. Cl. .................. 382/141; 382/145; 382/209; 382/218
(58) Field of Classification Search .................. 382/141, 382/145, 209, 218
   See application file for complete search history.

(56) References Cited

U.S. PATENT DOCUMENTS

| 5,600,736 | A | | 2/1997 | Hagita |
| 5,890,808 | A | * | 4/1999 | Neff et al. .................... 382/209 |
| 7,132,651 | B2 | * | 11/2006 | Pop et al. .................... 250/307 |
| 7,468,739 | B2 | * | 12/2008 | Fusama ....................... 348/142 |
| 2002/0075984 | A1 | * | 6/2002 | Knecht et al. ............... 376/253 |
| 2003/0039404 | A1 | | 2/2003 | Bourret |
| 2003/0108223 | A1 | | 6/2003 | Prokoski |

OTHER PUBLICATIONS

PCT International Search Report and Written Opinion from PCT/US07/10018 mailed on Feb. 7, 2008.

* cited by examiner

*Primary Examiner*—Charles Kim
*Assistant Examiner*—Utpal Shah
(74) *Attorney, Agent, or Firm*—Kenyon & Kenyon LLP

(57) ABSTRACT

A method for determining the inner surface and an outer surface of a sample flake through the use of digital image photography wherein digital images of a sample flake first surface and second surface are compared to a known inner surface and known outer surface of a reference flake.

10 Claims, 2 Drawing Sheets

METHOD FOR POSITIVE IDENTIFICATION OF INNER SURFACE AND OUTER SURFACE OF SAMPLE FLAKES

FIELD OF THE INVENTION

The present invention relates to identification of an inner surface and an outer surface of sample flakes. More specifically, the present invention relates to identification of an inner surface and an outer surface of Chalk River Unidentified Deposit (CRUD) flakes on nuclear fuel rods and apparatus placed within a nuclear reactor in the cases where the normal visual identification can not be applied due to flake sample collection (i.e. large missing portions from the flake inner or outer surface).

BACKGROUND INFORMATION

Samples of materials deposited on the exterior of nuclear fuel rods are needed by nuclear plant operators in order to perform material characteristic analysis. This material characteristic analysis allows the plant operators to understand the overall health of fuel assemblies placed in a nuclear reactor by looking at the types and mechanisms of degradation affecting the fuel assemblies. The material characteristic analysis identifies components within the reactor coolant system which may be failing or need attention.

Material that deposits or plates onto nuclear systems, such as CRUD upon fuel rods, can affects heat transfer characteristics of the components. In the case of CRUD, thicker layers of CRUD provide an insulating effect for the rod. The heat transfer capability of the fuel rods and associated assemblies, consequently, is decreased. The amounts of CRUD can vary significantly, thereby affecting the overall performance of fuel assemblies to such an extent that these fuel assemblies may need to be replaced/removed from service.

CRUD layers themselves are not homogeneous along their thickness. The material constituents of CRUD can vary greatly from the inner layer (inner surface) directly deposited on a specific heated surface, for example a zirconium fuel rod, to the outer layer (outer surface) still in contact with the reactor cooling water. To perform an accurate analysis of CRUD flakes, therefore, electronic microscope operators must determine whether the surface of the material being analyzed is an inner surface (i.e. the surface facing the center axis of the fuel rod) or an outer surface (i.e. the surface facing the coolant/moderator).

There is a need to determine an outer surface and an inner surface of a sample flake so that appropriate material analysis of the flake can be performed.

SUMMARY

It is therefore an objective of the present invention to determine an inner surface and an outer surface of a sample flake. The objective of the present invention is achieved as illustrated and described. The present invention provides a method to identify an inner surface and an outer surface of a sample flake when the normal visual identification is impossible. The method comprises the steps of obtaining the sample flake, obtaining a digital image of a first side of the sample flake and obtaining a digital image of a second side of the sample flake. The method also comprises the steps of mathematically comparing the digital image of the first side of the sample flake to a digital image of a reference flake inner surface, mathematically comparing the digital image of the second side of the sample flake to the digital image of the reference flake inner surface, mathematically comparing the digital image of the first side of the sample flake to a digital image of a reference flake outer surface and mathematically comparing the digital image of the second side of the sample flake to the digital image of the reference flake outer surface. The method further entails determining the inner surface and the outer surface of the sample flake from the steps of mathematically comparing the digital image of the first side of the sample flake to the digital image of the reference flake inner surface, mathematically comparing the digital image of the second side of the sample flake to the digital image of the reference flake outer surface, mathematically comparing the digital image of the first side of the sample flake to the digital image of the reference flake outer surface, mathematically comparing the digital image of the second side of the sample flake to the digital image of the reference flake surface inner surface by determining a greater similarity of one of the first side surface and the second side surface to one of the inner surface and the outer surface of the sample flake.

The method may also include that the step of mathematically comparing the digital image of the first side of the sample flake to the digital image of the reference flake inner surface comprises selecting a template region of the digital image of the first side of the sample flake and selecting a target region of the digital image from the reference flake surface. The method may also include the steps of placing the template region of the first side of the sample flake on the target region from the reference flake, creating an array of pixel pairs corresponding to the placing of the template region of the first side of the sample flake on the target region from the reference flake, and calculating a correlation coefficient between the corresponding pixels in the array.

The step of mathematically comparing the digital image of the second side of the sample flake to the digital image of the reference flake surface inner can comprise the steps of selecting a second template region of the digital image of the second side of the sample flake, selecting a second target region of the digital image from the reference flake surface, placing the second template region of the second side of the sample flake on the target region from the reference flake and creating a second array of pixel pairs corresponding to the placing of the template region of the second side of the sample flake on the target region from the reference flake. The step of mathematically comparing the digital image of the first side of the sample flake to the digital image of the reference flake outer surface comprises the steps of selecting a third template region of the digital image of the first side of the sample flake, selecting a third target region of the digital image from the reference flake surface, placing the third template region of the first side of the sample flake on the target region from the reference flake, and creating a third array of pixel pairs corresponding to the placing of the template region of the first side of the sample flake on the target region from the reference flake. The step of mathematically comparing the digital image of the second side of the sample flake to the digital image of the reference flake surface outer surface comprises selecting a fourth template region of the digital image of the second side of the sample flake, selecting a fourth target region of the digital image from the reference flake surface, placing the fourth template region of the second side of the sample flake on the target region from the reference flake, and creating a fourth array of pixel pairs corresponding to the placing of the template region of the second side of the sample flake on the target region from the reference flake.

The method may also be performed such that the step of determining the inner surface and the outer surface of the sample flake from the steps of mathematically comparing the digital image of the first side of the sample flake to a digital image of a reference flake inner surface, mathematically comparing the digital image of the second side of the sample flake to the digital image of the reference flake surface inner surface, mathematically comparing the digital image of the first side of the sample flake to a digital image of a reference flake outer surface, and mathematically comparing the digital image of the second side of the sample flake to the digital image of the reference flake surface outer surface is performed through calculation of a correlation coefficient and then comparing the correlation coefficient to a reference correlation coefficient.

The method may also be accomplished wherein the step of mathematically comparing the digital image of the first side of the sample flake to a reference flake comprises selecting a template region of the digital image of the first side of the sample flake, selecting a target region of the digital image from the reference flake surface, placing the template region of the first side of the sample flake on the target region from the reference flake, creating an array of pixel pairs corresponding to the placing of the template region of the first side of the sample flake on the target region from the reference flake, calculating a correlation coefficient between the corresponding pixels in the array, and moving the template region of the first side of the sample flake to a second location on the target region. The method can also be accomplished such that the method provides for creating a second array of pixel pairs corresponding to the placing of the template region on the first side of the sample flake on the target region from the reference flake second location, calculating a second correlation coefficient between corresponding pixels in the array in the second location on the target, calculating an average correlation coefficient from the correlation coefficient and the second correlation coefficient and calculating a maximum correlation coefficient from the correlation coefficient and the second correlation coefficient.

The method may be accomplished such that the sample flake is obtained from a heating component of a boiling water reactor or a pressurized water reactor. The method may be accomplished such that sample flake is obtained from a fuel pin. The method may be accomplished such that the sample flake is obtained from a steam generator tube or other component of the primary circuit. The method may also be accomplished such that the reference flake is obtained from the same fuel assembly pin batch as the sample flake. The method may also be accomplished such that the inner surface of the sample flake is determined through a higher correlation coefficient compared to the reference flake inner surface compared to a reference flake outer surface.

DETAILED DESCRIPTION

Figure 1:
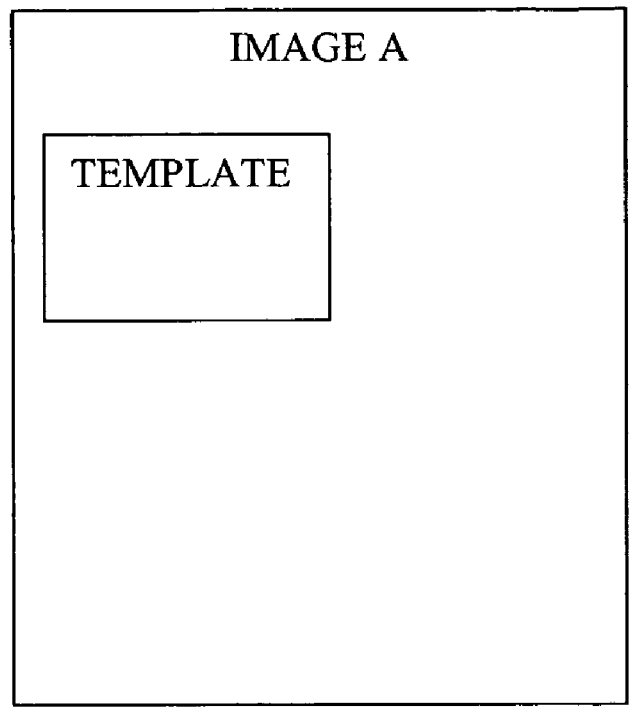
FIG. 1 is a view of a template obtained from a flake placed upon an image A.

The present invention provides a method of mathematically comparing digital images of a flake surface under test with those of a known sample or samples to identify the inner and outer surface of the test case (i.e. the sample flake in question).

CRUD flakes are used to analyze the "in situ" CRUD (fuel deposit) composition. The nature of these CRUD flakes, and conventional methods used to obtain such flakes, results in the loss of some of the material from the surface of the flake. The present invention provides a method to compensate for these problems by allowing analysis of flakes as obtained from field samples. The present invention may be used in conjunction with known scanning electron microscope trace zirconium element analysis methods used to identify material constituents of sample flakes. The method according to the present invention provides for positive identification of inner and outer surfaces of sample flakes obtained from fuel deposits, as an exemplary embodiment. The present inventive method includes digital analysis of scanning electron microscope images (or other high quality visual images) of known outer and inner surfaces of fuel deposits to quantify identification information of the flakes which have unknown. Information obtained from the known reference flakes includes surface curvature, smoothness of surfaces, and amounts of pitting on surfaces. The reference flake may be obtained from a same fuel pin batch as the materials to be tested.

Digital images of the unknown flake samples are also obtained. The digital images of the known and the unknown samples are then compared. In the inventive method, scanning electron microscope images are "read" by rastering the digital image and by digitally comparing the unknown images of the sample flake with known inner and outer surface images obtained from other reference flakes belonging to the same fuel pin batch to allow the inner and outer surfaces to be positively identified. The comparison is performed on images with the same scale. The present invention takes a smaller segment of one image (the template) and compares this image, point-by-point, to a target image. In the present invention, either of the reference flake or the sample flake may be used as either the template or the target image. At each point in the images obtained, a correlation coefficient is determined between each point in the template and the corresponding point in the target image. If any location within the target image has the same relative point amplitude as the template, the correlation coefficient will be high value (close to 1). The probability is therefore increased for matching the sample flake surface with the known surface to which it is being compared. The present method may also work regardless of any absolute offsets or scaling differences. A given minimum threshold of correlation coefficient is selected as a criterion for success.

To achieve the objectives of the invention and perform a comparison, a flake such as a CRUD flake is removed from a surface of a component, such as a nuclear fuel rod. The removal of the flake can be through any method, such as through scraping, cutting or abrasion. The sample flake is then compared through a combination of visual data coupled with numerical analysis to allow for the identification of an inner and an outer r of the sample flake.

The sample flake is taken from the sampling site and images of the flake are obtained through the use of a scanning electron microscope, as a non-limiting example. Other techniques providing a digital picture can be used. Differing areas of the sample flake are used to allow several different positions to be evaluated. Additionally, both sides of the sample flake are used to obtain pictures. The images obtained through the scanning electron microscope are then used to compare against a reference standard flake (i.e. a flake with a known inner surface and outer surface). The reference standard flake, as provided above, has been previously identified to have a known inner surface and an outer surface.

Sections of images of both the known and unknown images are then statistically compared. If the unknown test surface image is from a flake inner face, the algorithm will show a higher correlation with the known flake inner surface image than with a known flake outer surface image.

The unknown surface images are initially provided as a blind test, although identification of each CRUD flake may also occur.

The present invention looks for statistical similarity of the surface features of the target and template rather than exact matches. When applied to the unknown and known cases, the method provides correlation between the sets of images. To verify accuracy of the new algorithm, scanning electron microscope measurement of trace zirconium was applied to a flake to confirm the match performed by the image correlation. The present invention will next be described by an exemplary embodiment.

EXEMPLARY EMBODIMENT

Figure 2:
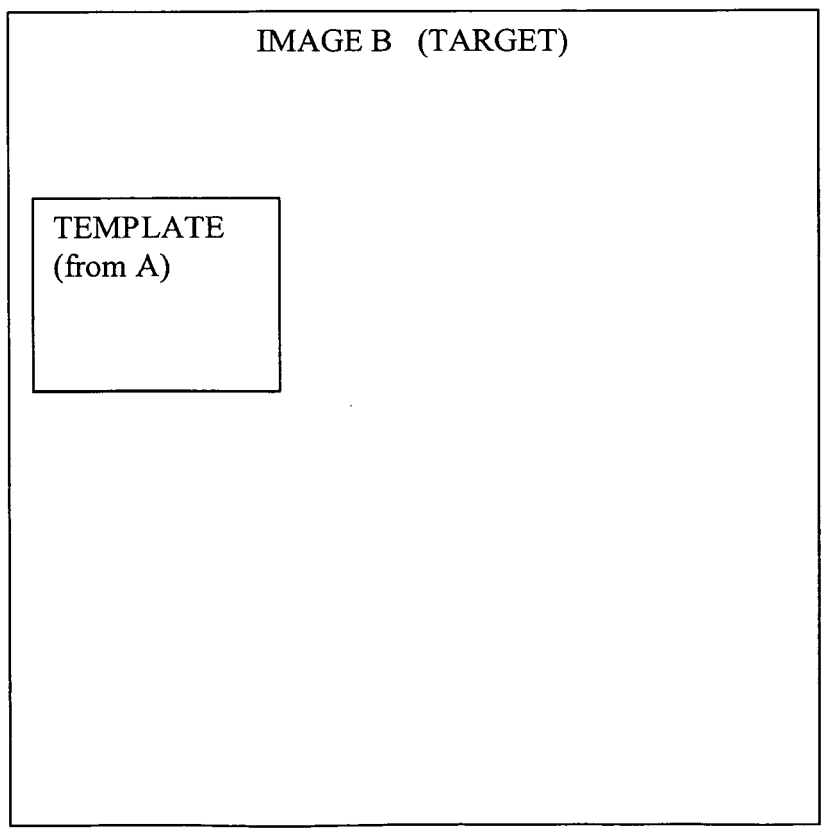
FIG. 2 is a view of a template obtained from a flake placed upon a target image B.

1. Two images are selected from flakes for comparison (a flake with a known inner surface and outer surface, and a flake with unknown inner and outer surfaces).
2. For the purpose of describing the process, the images are designated A and B.
3. Lettering or other regions that are not part of the actual surface under evaluation are cropped out of the images under evaluation.
4. Referring to FIG. 1, a TEMPLATE region is selected in image A. The TEMPLATE should be large enough to contain basic structural images of the flake but small enough that multiple copies of the TEMPLATE will fit within the area of the B image (TARGET).
5. Referring to FIG. 2, starting with the TEMPLATE image aligned in the upper left corner of the TARGET image B, an array of corresponding pixel pairs is created from the TEMPLATE and TARGET images. If the TEMPLATE image has 100 pixels, the array will contain 100 pairs.

Using 1 as the starting row and column for each image, and assuming that the TEMPLATE image size is 4*4 pixels for illustration, the basic form of the array will be as follows:

TEMPLATE Pixel (Row 1, Col 1), TARGET B Pixel (Row 1, Col 1)
TEMPLATE Pixel (Row 1, Col 2), TARGET B Pixel (Row 1, Col 2)
TEMPLATE Pixel (Row 1, Col 3), TARGET B Pixel (Row 1, Col 3)
TEMPLATE Pixel (Row 1, Col 4), TARGET B Pixel (Row 1, Col 4)
TEMPLATE Pixel (Row 2, Col 1), TARGET B Pixel (Row 2, Col 1)
TEMPLATE Pixel (Row 2, Col 2), TARGET B Pixel (Row 2, Col 2)
TEMPLATE Pixel (Row 2, Col 3), TARGET B Pixel (Row 2, Col 3)
TEMPLATE Pixel (Row 2, Col 4), TARGET B Pixel (Row 2, Col 4)
TEMPLATE Pixel (Row 3, Col 1), TARGET B Pixel (Row 3, Col 1)
TEMPLATE Pixel (Row 3, Col 2), TARGET B Pixel (Row 3, Col 2)
TEMPLATE Pixel (Row 3, Col 3), TARGET B Pixel (Row 3, Col 3)
TEMPLATE Pixel (Row 3, Col 4), TARGET B Pixel (Row 3, Col 4)
TEMPLATE Pixel (Row 4, Col 1), TARGET B Pixel (Row 4, Col 1)
TEMPLATE Pixel (Row 4, Col 2), TARGET B Pixel (Row 4, Col 2)
TEMPLATE Pixel (Row 4, Col 3), TARGET B Pixel (Row 4, Col 3)
TEMPLATE Pixel (Row 4, Col 4), TARGET B Pixel (Row 4, Col 4)

Using a shortened notation of TEM(1,1) and TAR(1,1) for TEMPLATE pixel 1,1 and TARGET Image pixel 1,1 the array may be listed as:
TEM (1,1), TAR (1,1)
TEM (1,2), TAR (1,2)
TEM (1,3), TAR (1,3)
TEM (1,4), TAR (1,4)
TEM (2,1), TAR (2,1)
TEM (2,2), TAR (2,2)
TEM (2,3), TAR (2,3)
TEM (2,4), TAR (2,4)
TEM (3,1), TAR (3,1)
TEM (3,2), TAR (3,2)
TEM (3,3), TAR (3,3)
TEM (3,4), TAR (3,4)
TEM (4,1), TAR (4,1)
TEM (4,2), TAR (4,2)
TEM (4,3), TAR (4,3)
TEM (4,4), TAR (4,4)

6. Next, the correlation coefficient between the corresponding pixels in the array is calculated.
7. The correlation coefficient for the first TEMPLATE location—pixel TEM(1,1) aligned with TAR(1,1) is calculated.
8. The TEMPLATE image is moved one pixel at a time repeating steps 5-7. In each position, the TEMPLATE image must be within the bounds of the TARGET image B. The correlation coefficient should be calculated at every position where the TEMPLATE can overlay the TARGET image pixels.

Using the short notation in step 5, the array for the second target position will be:
TEM (1,1), TAR(1,2)
TEM (1,2), TAR(1,3)
TEM (1,3), TAR(1,4)
TEM (1,4), TAR(1,5)
TEM (2,1), TAR(2,2)
TEM (2,2), TAR(2,3)
TEM (2,3), TAR(2,4)
TEM (2,4), TAR(2,5)
TEM (3,1), TAR(3,2)
TEM (3,2), TAR(3,3)
TEM (3,3), TAR(3,4)
TEM (3,4), TAR(3,5)
TEM (4,1), TAR(4,2)
TEM (4,2), TAR(4,3)
TEM (4,3), TAR(4,4)
TEM (4,4), TAR(4,5)

And using an image B size of 100*100, the last array will be:
TEM (1,1), TAR(97,97)
TEM (1,2), TAR (97,98)
TEM (1,3), TAR (97,99)
TEM (1,4), TAR (97,100)
TEM (2,1), TAR (98,97)
TEM (2,2), TAR (98,98)
TEM (2,3), TAR (98,99)
TEM (2,4), TAR (98,100)
TEM (3,1), TAR (99,97)
TEM (3,2), TAR (99,98)
TEM (3,3), TAR (99,99)
TEM (3,4), TAR (99,100)
TEM (4,1), TAR (100,97)
TEM (4,2), TAR (100,98)

TEM (4,3), TAR (100,99)
TEM (4,4), TAR (100,100)

9. The number of correlation results can be calculated from the pixel dimensions of the TARGET image B and the TEMPLATE. For the previous example of a 4*4 TEMPLATE and a 100*100 TARGET image B, there will be 97*97 positions where the TEMPLATE will overlap the TARGET image B.
10. The maximum and average correlation values are then calculated.
11. The same size TEMPLATE from image B for comparison is selected within TARGET image A. The correlation coefficient array (Steps 4 through 10) are repeated using the TEMPLATE from image B and the TARGET image A.
12. The maximum and average correlation values characterize the matching between IMAGES A and B.
13. The correlation values may then be used to compare different sets of images.

TABLE 1

Correlations obtained for a given set of samples
Combined Maximum Values for Each Pair

| | Template | | | | |
|---|---|---|---|---|---|
| Target Image | B (Side B) | C (Side A) | E (Side A) | D (Side B) | F (Side B) |
| C (Side A) | | 1 | | | |
| E (Side A) | | 0.602 | | | |
| D (Side B) | | 0.556 | 0.563 | 1 | |
| F (Side B) | | 0.598 | | 0.695 | |
| G (Known ID) | 0.334 | | | | |
| H (Known OD) | 0.418 | | | | |
| L (Known OD) | | 0.551 | 0.622 | 0.661 | 0.761 |

ID = inner surface
OD = outer surface

Exemplary results of the method are provided above, where the maximum correlations for each image pair used for comparison are shown. Correlations were measured with each image alternatively being used as a template or target. For example, images C and D can be compared by taking the template from C and comparing the image D or vice versa. In the exemplary embodiment provided, images C, D, E, F and L are taken in a 10 micron scale and image B, G and H are taken in a 200 micron scale. Also, for example, images G, H and L belong to known inner and outer surfaces. Images B, D and F belong to un-identified side B, of researched flake and images C and E belong to un-identified side A of the same researched flake.

The correlations obtained from a given set of comparisons are presented in Table 1. Table 1 indicates that the side A images compare favorably with each other as compared with side A images compared to other surfaces. Side B images also compare favorably with themselves as compared to other surfaces. This check of evaluating a side image to itself and other surfaces can be performed to verify that the comparison technique is accurate. The 200 micron scale side B image has a better correlation (i.e. higher correlation factor) with the outer surface image of the known reference flake of the same scale. As is evident from the above information, more detailed scale factors allow for more accurate comparisons and correspondingly higher correlation values. Additionally, the 10 micron scale side B images correlate better with the outer 10 micron images of the known reference flake than do the side A images of the same scale. As provided in Table 1, larger scales (scales with less resolution) result in a less precision in correlation which in turn decreases correlation value comparisons.

In the exemplary embodiment provided, the results illustrate the maximum correlation values between differing image sets. Image B, (of an unknown flake surface (ID or OD)) is compared to same scale images G (known ID surface) and H (known OD surface). Numerical correlations of images B and G are calculated to an average value of 0.334 while the numerical correlations of images B and H average to a higher value of 0.418. These results disclose that image B has a higher correlation with image H which is a known OD image.

Images C and E (of an unknown flake surface side A (ID or OD)) are compared to the same scale image L (a known OD surface). The numerical correlations are 0.551 and 0.622 accordingly, therefore the later correlations is better than the 0.551 correlation value. Finally, images D and F of the opposite unknown flake surface side B are compared to the same scale image L. The numerical correlations are 0.661 and 0.761. The data indicates that images D and F more closely correlate (than images C and E) with image H which is a known OD image.

Below are the best correlations for each image taken from the above test example:

| Image Correlation | Unknown Flake Side (A or B) | Best |
|---|---|---|
| B | B | OD |
| D | B | OD |
| F | B | OD |

The images used in the exemplary embodiment used for testing did not include a known ID image at the same scale as images C, D, E and F. The correlations show that the unknown flake side B has a higher numerical correlation with the known OD images. Thus, by process of elimination, side A images coincide with the flake ID as each flake contains a single ID surface and the remaining surface is an OD surface.

The correlation coefficient, using this process, provides a statistical measure of similarity of the images of template and target. The correlation coefficient is not sensitive to pixel offset and gain and therefore does not incorporate errors from this visual inaccuracies. If the offset and gain are considered more important in the image comparison, the correlation coefficient may be replaced with an F-test statistical function. Some applications may use an average or product of both functions according to the needs of the user. Other applications may require different comparison functions.

The size and geometry of the TEMPLATE image can be modified as needed to provide the desired image structure comparison. The TEMPLATE can be tested on its parent image to validate performance. While the correlation function or F-test function will always provide a maximum value of 1.0 if the TEMPLATE is from the TARGET image, the average of the correlation or F-test measurements over the full TARGET image will show how representative the TEMPLATE region is for the whole image.

What is claimed is:
1. A method to identify an inner surface and an outer surface of a sample flake, comprising:
   obtaining the sample flake;
   obtaining a digital image of a first side of the sample flake;
   obtaining a digital image of a second side of the sample flake;

mathematically comparing the digital image of the first side of the sample flake to a digital image of a reference flake inner surface;
mathematically comparing the digital image of the second side of the sample flake to the digital image of the reference flake inner surface;
mathematically comparing the digital image of the first side of the sample flake to a digital image of a reference flake outer surface;
mathematically comparing the digital image of the second side of the sample flake to the digital image of the reference flake outer surface; and
determining a inner surface and an outer surface of the sample flake from the steps of mathematically comparing the digital image of the first side of the sample flake to the digital image of the reference flake inner surface, mathematically comparing the digital image of the second side of the sample flake to the digital image of the reference flake inner surface, mathematically comparing the digital image of the first side of the sample flake to the digital image of the reference flake outer surface, mathematically comparing the digital image of the second side of the sample flake to the digital image of the reference flake surface outer surface by determining a greater similarity of one of the first side surface and the second side surface to one of the inner surface and the outer surface of the sample flake.

2. The method according to claim 1, wherein the step of mathematically comparing the digital image of the first side of the sample flake to the digital image of the reference flake inner surface comprises:
selecting a template region of the digital image of the first side of the sample flake;
selecting a target region of the digital image from the reference flake surface;
placing the template region of the first side of the sample flake on the target region from the reference flake;
creating an array of pixel pairs corresponding to the placing of the template region of the first side of the sample flake on the target region from the reference flake; and
calculating a correlation coefficient between the corresponding pixels in the array, wherein the step of mathematically comparing the digital image of the second side of the sample flake to the digital image of the reference flake inner surface comprises the steps of:
selecting a second template region of the digital image of the second side of the sample flake;
selecting a second target region of the digital image from the reference flake surface;
placing the second template region of the second side of the sample flake on the target region from the reference flake; and
creating a second array of pixel pairs corresponding to the placing of the template region of the first side of the sample flake on the target region from the reference flake, wherein the step of mathematically comparing the digital image of the first side of the sample flake to the digital image of the reference flake outer surface comprises the steps of:
selecting a third template region of the digital image of the first side of the sample flake;
selecting a third target region of the digital image from the reference flake surface;
placing the third template region of the first side of the sample flake on the target region from the reference flake; and
creating a third array of pixel pairs corresponding to the placing of the template region of the first side of the sample flake on the target region from the reference flake, wherein the step of mathematically comparing the digital image of the second side of the sample flake to the digital image of the reference flake outer surface comprises:
selecting a fourth template region of the digital image of the second side of the sample flake;
selecting a fourth target region of the digital image from the reference flake surface;
placing the fourth template region of the second side of the sample flake on the target region from the reference flake; and
creating a fourth array of pixel pairs corresponding to the placing of the fourth template region of the second side of the sample flake on the target region from the reference flake.

3. The method according to claim 2, wherein the step of determining the inner surface and the outer surface of the sample flake from the steps of mathematically comparing the digital image of the first side of the sample flake to a digital image of a reference flake inner surface, mathematically comparing the digital image of the second side of the sample flake to the digital image of the reference flake inner surface, mathematically comparing the digital image of the first side of the sample flake to a digital image of a reference flake outer surface, and mathematically comparing the digital image of the second side of the sample flake to the digital image of the reference flake outer surface is performed through calculation of a correlation coefficient and then comparing the correlation coefficient to a reference correlation coefficient.

4. The method according to claim 1, wherein the step of mathematically comparing the digital image of the first side of the sample flake to a reference flake comprises:
selecting a template region of the digital image of the first side of the sample flake;
selecting a target region of the digital image from the reference flake surface;
placing the template region of the first side of the sample flake on the target region from the reference flake;
creating an array of pixel pairs corresponding to the placing of the template region of the first side of the sample flake on the target region from the reference flake;
calculating a correlation coefficient between the corresponding pixels in the array;
moving the template region of the first side of the sample flake to a second location on the target region;
creating a second array of pixel pairs corresponding to the placing of the template region on the first side of the sample flake on the target region from the reference flake second location;
calculating a second correlation coefficient between corresponding pixels in the array in the second location on the target;
calculating an average correlation coefficient from the correlation coefficient and the second correlation coefficient; and
calculating a maximum correlation coefficient from the correlation coefficient and the second correlation coefficient.

5. The method according to claim 4, wherein the step of determining the inner surface and the outer surface of the sample flake from the steps of mathematically comparing the digital image of the first side of the sample flake to a digital image of a reference flake inner surface, mathematically comparing the digital image of the second side of the sample flake to the digital image of the reference flake inner surface, mathematically comparing the digital image of the first side of the sample flake to a digital image of a reference flake outer surface, and mathematically comparing the digital image of the second side of the sample flake to the digital image of the reference flake outer surface is performed through calculations of a correlation coefficient and then comparing the correlation coefficient to a reference correlation coefficient.

6. The method according to claim 1, wherein the sample flake is obtained from a deposit on at least one of a heating surface and a heated surface in a boiling water reactor.

7. The method according to claim 1, wherein the sample flake is obtained from a deposit on at least one of a heating surface and a heated surface in a pressurized water reactor.

8. The method according to claim 6, wherein the reference flake is obtained from a same fuel assembly pin batch as the sample flake.

9. The method according to claim 7, wherein the reference flake is obtained from a same fuel assembly pin batch as the sample flake.

10. The method according to claim 1, wherein the inner surface and the outer surface of the sample flake are each determined through a comparison to one of the outer surface and the inner surface of the reference flake surface, wherein a higher correlation coefficient determined between the comparison between each of the outer surface and the inner surface of the sample flake to the one of the outer surface and the inner surface of the reference flake determines one of the inner surface and the outer surface designation of the sample flake.

* * * * *